US012044418B2

(12) United States Patent
Song

(10) Patent No.: US 12,044,418 B2
(45) Date of Patent: Jul. 23, 2024

(54) KOREAN UNDERFLOOR HEATING BLOCK SET

(71) Applicant: Kichul Song, Asan-si (KR)

(72) Inventor: Kichul Song, Asan-si (KR)

( * ) Notice: Subject to any disclaimer, the term of this patent is extended or adjusted under 35 U.S.C. 154(b) by 459 days.

(21) Appl. No.: 17/605,892

(22) PCT Filed: Apr. 20, 2020

(86) PCT No.: PCT/KR2020/005210
§ 371 (c)(1),
(2) Date: Oct. 22, 2021

(87) PCT Pub. No.: WO2020/218789
PCT Pub. Date: Oct. 29, 2020

(65) Prior Publication Data
US 2022/0107092 A1 Apr. 7, 2022

(30) Foreign Application Priority Data
Apr. 22, 2019 (KR) ........................ 10-2019-0046537

(51) Int. Cl.
*F24D 3/14* (2006.01)
*E04F 15/18* (2006.01)
*F16L 3/12* (2006.01)

(52) U.S. Cl.
CPC .............. *F24D 3/141* (2013.01); *E04F 15/18* (2013.01); *F16L 3/12* (2013.01); *F24D 2220/2081* (2013.01)

(58) Field of Classification Search
CPC .. F24D 3/141; F24D 2220/2081; E04F 15/18; E04F 2290/023
See application file for complete search history.

(56) References Cited

U.S. PATENT DOCUMENTS

2016/0054071 A1* 2/2016 Cordova .................. F28F 7/02 165/164

FOREIGN PATENT DOCUMENTS

| | | | | |
|---|---|---|---|---|
| CN | 108954457 A | * 12/2018 | ......... F24D 19/0082 |
| JP | 2005-241101 A | 9/2005 | |
| KR | 10-2000-0074307 A | 12/2000 | |
| KR | 10-2002-0051911 A | 6/2002 | |
| KR | 10-2005-0021749 A | 3/2005 | |
| KR | 10-2010-0049524 A | 5/2010 | |
| KR | 10-2011-0029322 A | 10/2011 | |

(Continued)

*Primary Examiner* — Kun Kai Ma
(74) *Attorney, Agent, or Firm* — Maschoff Brennan

(57) ABSTRACT

The present invention relates to a Korean underfloor heating block set, and more specifically, to a Korean underfloor heating block set which makes it possible to more easily and quickly construct a Korean underfloor heating system when constructing or repairing Korean underfloor heating system of a structure such as a building, an apartment, a general house, etc., as well as to create a more eco-friendly residential space while providing effects beneficial to a human body through loess, sericite, precious serpentine, and gelite. Through the present invention, provided is an effect that makes it possible to safely insert, without misalignment, an XL-pipe that is bent to be rounded at a corner or an edge, by forming a lower plate pipe (110) and an upper plate pipe (210) to include a U-shaped pipe portion, a curved branch type pipe portion, and a linear type pipe portion.

1 Claim, 7 Drawing Sheets

(56) References Cited

FOREIGN PATENT DOCUMENTS

| | | | | |
|---|---|---|---|---|
| KR | 101604861 | B1 | * | 3/2016 |
| KR | 10-2030442 | B1 | | 10/2019 |

* cited by examiner

KOREAN UNDERFLOOR HEATING BLOCK SET

TECHNICAL FIELD

The present invention relates to a Korean underfloor heating block set, and more specifically, to a Korean underfloor heating block set which makes it possible to more easily and quickly construct a Korean underfloor heating system when constructing or repairing Korean underfloor heating system of a structure such as a building, an apartment, a general house, etc., as well as to create a more eco-friendly residential space while providing effects beneficial to a human body through loess, sericite, precious serpentine, and gelite.

BACKGROUND ART

In general, constructions such as buildings, apartments, and general houses are mostly constructed using cement, so that various toxins generated from cement cause a lot of harmful effects on the human body.

In addition, in the case of durable materials such as heat dissipation materials and interior decoration materials, most of them are petrochemical products, so they cause a harmful effect on the human body.

In particular, caustic soda added to cement adversely affects the human body for a long period of time due to its strong toxicity, and has been pointed out as a major factor causing various adult diseases, allergic rhinitis, and skin diseases.

For example, the conventional construction process of a Korean underfloor heating system using cement largely includes an insulating material construction step, a sand and gravel application step, a circulation pipe installation step, and a floor plastering step.

First, in the insulating material construction step which is a step of constructing styrofoam on the slab Korean underfloor heating system of the building, the styrofoam having a thickness of about 50 mm is laid on the slab.

Then, in the sand and gravel application step, sand or gravel is applied on the styrofoam to generate an Ondol effect. In this case, the sand and gravel are applied to have a thickness of about 50 mm.

In the circulation pipe installation step which is a step of installing the circulation pipe on the sand or gravel coated surface, the end of the circulation pipe is connected to the hot water circulation valve of a boiler so that the hot water circulates along the circulation pipe.

In the floor plastering step which is a step of plastering the circulation pipe to a predetermined thickness using cement, it is possible to prevent the circulation pipe from being damaged through the floor plastering step, so that the warmth of the circulation pipe is spread throughout the Korean underfloor heating system.

In the conventional Korean underfloor structure by such steps, since cement is used in the floor plastering step, the toxicity of cement is transmitted to the human body as it is.

Therefore, due to the toxicity of cement and the harmful toxicity of caustic soda added to cement, it adversely affects the human body for a long period of time, causing various adult diseases, allergic rhinitis, and skin diseases.

Furthermore, according to the related art, sand and gravel are required in the sand and gravel application step, so many workers and aggregates are required accordingly, which greatly increases the construction cost, and also curing time is required due to the plastering of cement, so that rapid construction cannot be performed.

Meanwhile, in order to solve the above problems, the construction using loess has been gradually increased in recent years, and the construction of a Korean underfloor heating system using loess is described in detail in Korean Unexamined Patent Publication No. 10-2002-0051911.

The construction of the loess Korean underfloor heating system according to the related art is made by attaching loess plates after a foamed concrete layer, arrangement of a circulation pipe, and a mortar layer on the slab layer are formed.

Therefore, according to the related art, in order to construct a loess plate, the constructions of the aerated concrete layer, the arrangement of the circulation pipe and the mortar layer are inevitably carried out, so the construction period is long and the construction process is complicated. As a result, the construction cost related to the construction of the loess Korean underfloor heating system Increases significantly.

Furthermore, because the conventional loess plate has the same shape as a square tile, the circulation pipe and the tile-shaped loess plate cannot be assembled together by block assembly.

Therefore, the process for constructing the loess Korea underfloor heating system is the same as that of the existing cement Korean underfloor heating system, so the construction period and cost cannot be fundamentally reduced. As a result, there is a structural problem that cannot preoccupy superior price competitiveness.

DOCUMENT OF RELATED ART (Patent document 1) Korean Unexamined Publication Patent No. 10-2002-0051911

DISCLOSURE

Technical Problem

Therefore, the present invention was invented to solve the above problems of the related art.

An object of the present invention is to provide a Korean underfloor heating block set which makes it possible to more easily and quickly construct a Korean underfloor heating system when constructing or repairing Korean underfloor heating system of a structure such as a building, an apartment, a general house, etc., as well as to create a more eco-friendly residential space while providing effects beneficial to a human body through loess, sericite, precious serpentine, and gelite.

That is, the present invention provides a Korean underfloor heating block set which makes the construction of a Korean underfloor system simple and convenient by assembling blocks, greatly reduces the construction period and construction cost of the Korean underfloor heating system, and provides a health-promoting function and an eco-friendly environment provided by loess, sericite, precious serpentine, and gelite.

Another object of the present invention is to make it possible to safely insert, without misalignment, an XL-pipe that is bent to be rounded at a corner or an edge, by forming a lower plate pipe (110) and an upper plate pipe (210) to include a U-shaped pipe portion, a curved branch type pipe portion, and a linear type pipe portion.

Still another object of the present invention is to form the coupling protrusion portion in the lower plate block (100) and the coupling concave portion in the upper plate block (200), so that the lower plate block and the upper plate block can be assembled more quickly and accurately without errors.

Technical Solution

To achieve the objects of the present invention, according to an embodiment of the present invention, a Korean underfloor heating block set includes:

a lower plate block (100) formed on an upper surface thereof with a lower plate pipe (110) for accommodating an XL-pipe and formed of a loess material, and an upper plate block (200) constructed to overlap the lower plate block, formed on a bottom surface thereof with an upper plate pipe (210) for accommodating an XL pipe, and formed of a mineral material beneficial to a human body, so that it is possible to achieve the objects.

Advantageous Effects

According to the Korean underfloor heating block set of the present invention, it is possible to make the construction of a Korean underfloor heating system simple and convenient by assembling blocks, greatly reduce the construction period and construction cost of the Korean underfloor heating system, and provide a health-promoting function and an eco-friendly environment provided by loess, sericite, precious serpentine, and gelite.

In addition, provided is an effect that makes it possible to safely insert, without misalignment, an XL-pipe that is bent to be rounded at a corner or an edge, by forming a lower plate pipe (110) and an upper plate pipe (210) to include a U-shaped pipe portion, a curved branch type pipe portion, and a linear type pipe portion.

In addition, it is possible to form the coupling protrusion portion in the lower plate block (100) and the coupling concave portion in the upper plate block (200), so that the lower plate block and the upper plate block can be assembled more quickly and accurately without errors.

DETAILED DESCRIPTION OF REFERENCE NUMERAL

Figure 1:
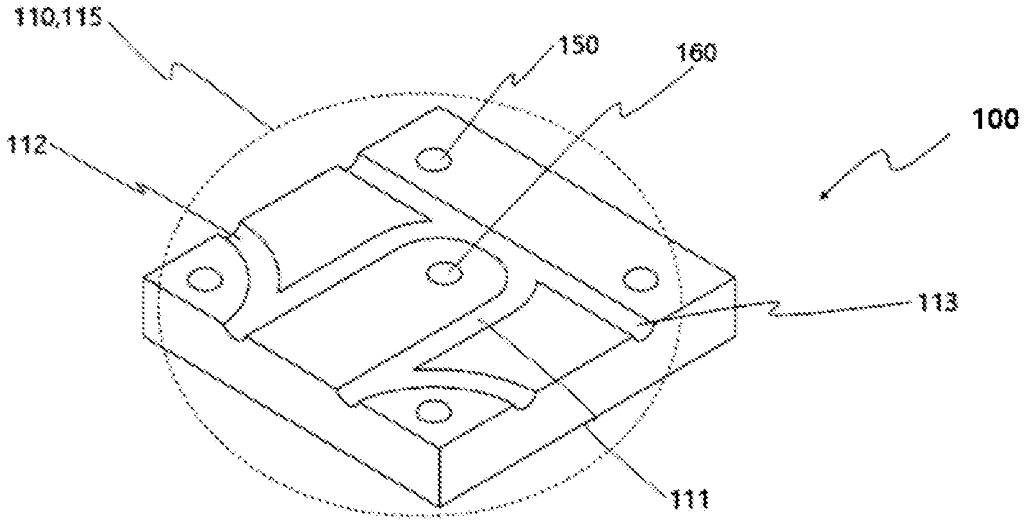
FIG. 1 is a perspective view of a lower plate block 100 of a Korean underfloor heating block set according to an embodiment of the present invention.

100: Lower plate block
200: Upper plate block

BEST MODE

Mode for Invention

According to an embodiment of the present invention, a Korean underfloor heating block set includes:

a lower plate block 100 formed on an upper surface thereof with a lower plate pipe 110 for accommodating an XL-pipe and formed of a loess material, and an upper plate block 200 constructed to be superimposed on the lower plate block, formed on a bottom surface thereof with an upper plate pipe 210 for accommodating am XL pipe, and formed of a mineral material beneficial to a human body.

In this case, the upper plate block 200 is positioned parallel to an upper side of the lower plate block in order to arrange the lower plate block 100 in a block shape, insert an XL-pipe 300 into a lower plate conduit formed in the lower plate block, and securely fix the XL-pipe.

In this case, the lower plate pipe 110 includes:

a non-straight lower plate pipe 115 including a U-shaped pipe portion 111 formed on a central portion;

a curved branch type pipe portion 112 formed on both sides of the U-shaped pipe portion 111; and a linear type pipe portion 113 formed on an upper side of the U-shaped pipe portion 111, or a straight lower plate pipe 119 including at least two straight pipe sections 117 formed horizontally at a predetermined interval.

In this case, according to an additional aspect, the lower plate block 100 includes at least one edge coupling protrusion portion 150 protruding from each edge or the lower late block 100; and at least one inner coupling protrusion portion 160 protruding from an inside of the lower plate block 100.

In this case, the upper plate pipe 210 includes a non-straight lower plate pipe 215 including a U-shaped pipe portion 211 formed on a central portion;

a curved branch type pipe portion 212 formed on both sides of the U-shaped pipe portion 211; and a linear type pipe portion 213 formed on an upper side of the U-shaped pipe portion 211, or a straight lower plate pipe 219 including at least two straight pipe sections 217 formed horizontally at a predetermined interval.

In this case, according to an additional aspect, the upper plate block 200 includes at least one edge coupling concave portion 250 concaved in each edge of the upper plate block 200; and at least one inner coupling, concave portion 260 concaved in the upper plate block 200.

In this case, the mineral beneficial to the human body and forming the upper plate block 200 includes at least one of sericite, serpentine and gelite, or a mixture thereof.

Hereinafter, a Korean underfloor heating block set according to an embodiment of the present invention will be described in detail.

FIG. 1 is a perspective view of a lower plate block 100 of a Korean underfloor heating block set according to an embodiment of the present invention.

Figure 2:
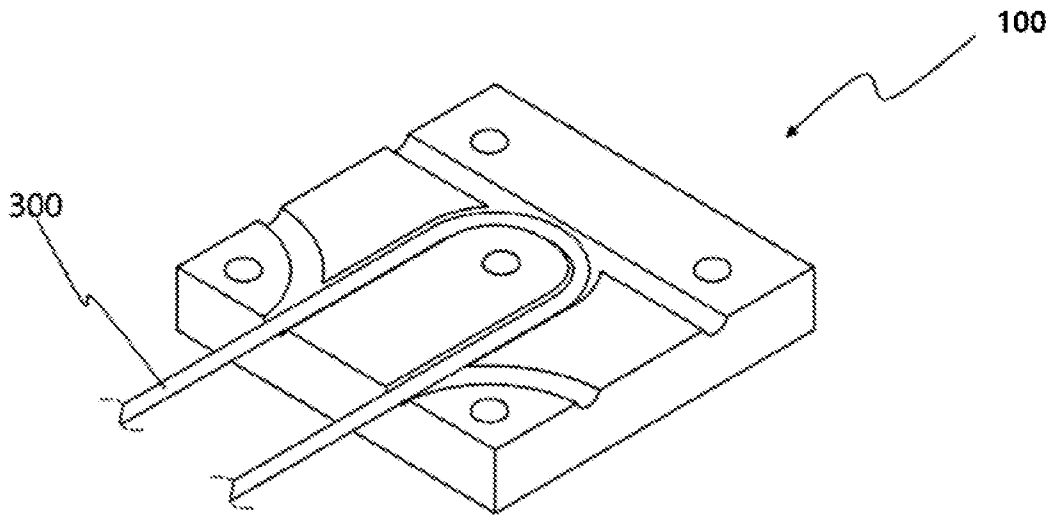
FIG. 2 is an exemplary view in which an XL-pipe is inserted into the lower plate block 100 of a Korean underfloor heating block set according to an embodiment of the present invention.

FIG. 2 is an exemplary view in which an XL-pipe is inserted into the lower plate block 100 of the Korean underfloor heating block according to an embodiment of the present invention.

As shown in FIGS. 1 and 2, the lower plate block 100 is formed on an upper surface thereof with a lower plate pipe 110 for accommodating an XL-pipe and formed of a loess material, As described above, the lower plate block 100 is formed using loess instead of toxic cement, so that the health of the human body is improved by far-infrared rays and antibacterial action and a nature-friendly residential space is created.

In this case, briefly explaining the properties of loess, loess has effects that cannot be easily imagined, including decomposition, magnetic field, absorption, transparency, vitality, and the medicine property dissolved in it. In particular, the far-infrared rays emitted from loess activate the physiological functions of the human body and provide great help in health promotion, such as humidity control, antibacterial and insect repellent, air purification, deodorization, and warmth. This act has already been scientifically proven.

For this reason, loess has been used in various ways for building materials, daily products, and treatments since ancient times, and the efficacy of loess is well described in Bonchogangmok, Donguibogam, and Myungbyeolbook.

That is, loess is not poisonous, has a good effect on the lungs, spleen, and bladder, and is also good for the liver.

Loess is effective for hemostasis, dizziness, competition, and diarrhea, and is good for seasickness. Specially, because loess acts to strengthen flesh and muscles by lowering bioenergy, the loess is usefully used as a raw elixir.

Therefore, in the present invention, since the lower plate block made of loess is used when constructing the Korean underfloor heating system of the building, it retains the effect of loess as described above. Moreover, since the Korean underfloor heating system is constructed by block-assembling the lower plate block and upper plate block, the construction period and cost related to the construction of the Korean underfloor heating system are innovatively reduced, and various useful effects of loess are provided.

In more detail, in the related art, after the construction of the aerated concrete layer and the circulation pipe and the formation of the mortar layer, the loess plate was constructed, so the construction process was inevitably complicated.

Therefore, the construction of the concrete layer, the mortar layer, and the individual circulation pipe takes a considerable amount of work and curing time, so that the construction time has to be taken for a long time. As a result, a lot of material and human costs related to the construction work were spent.

Meanwhile, as a recent construction method, a corner tile and a straight tile are arranged on the floor in a square tile, and a type of tile molded with a silicon mold is used.

In this case, after the floor tile is installed, a hot water pipe is installed. Then, after the hot water pipe is installed, a steel plate or the like is fixed on the top thereof with a screw.

Then, after the steel plate is installed, a complicated process of finishing it with a floor plate or reinforced flooring is performed.

However, in the present invention, the Korean underfloor heating system of loess and mineral is constructed by simple block assembly of a set consisting of a lower plate block and an upper plate block, and an XL-pipe is also installed inside the block set, so that the construction can be carried out more simply and quickly.

Accordingly, the construction cost and construction period may be greatly reduced.

In addition, the lower plate pipe 110 includes:

a non-straight lower late pipe 115 including a U-shaped pipe portion 111 formed on a central portion;

a curved branch type pipe portion 112 formed on both sides of the U-shaped pipe portion 111; and a linear type pipe portion 113 formed on an upper side of the U-shaped pipe portion 111, or a straight lower plate pipe 119 including at least two straight pipe sections 117 formed horizontally at a predetermined interval.

That is, as shown in FIG. 1, the lower plate pipe 110 may be formed of the non-straight lower plate pipe 115 or the straight lower plate pipe 119.

Figure 8:
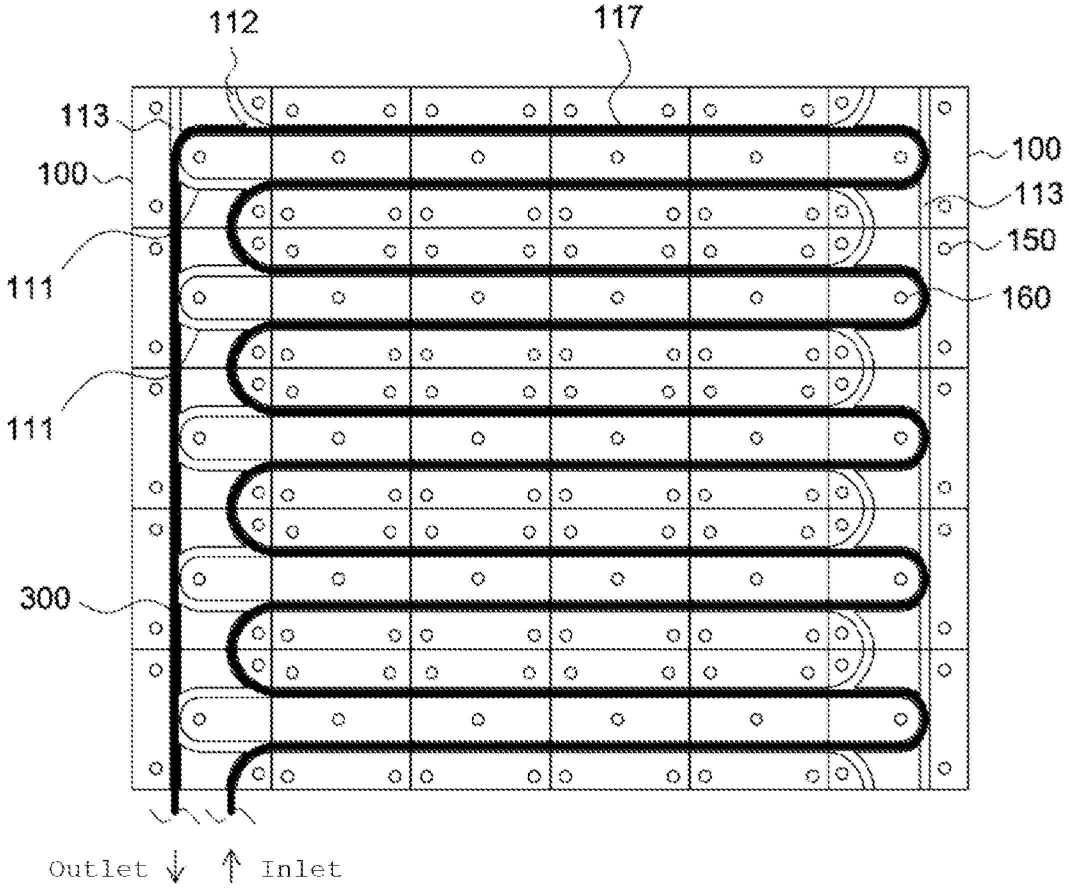
FIG. 8 is a plan view illustrating a construction state by arranging Korean underfloor heating block sets according to an embodiment of the present invention.

Thus, as shown in FIG. 8, because both ends are formed with the non-straight lower plate pipe 115 and the middle part are formed with the straight lower plate pipe 119, the non-straight lower plate pipe 115 or the straight lower plate conduit 119 may be positioned depending on the installing location.

In more detail, the U-shaped pipe portion 111 is formed on a central portion of the non-straight lower plate conduit 115.

Therefore, as shown in FIG. 2, there is a space into which a curved portion of the XL-pipe is inserted.

In addition, the curved branch type pipe portion 112 is formed on both sides of the U-shaped pipe portion 111.

Accordingly, when the curved branch type pipe portion 112 is formed on both sides, two XL-pipes are inserted. Since there are two curved portions, the curved branch type pipe portion 112 is formed on both sides of the U-shaped pipe portion 111 in order to insert all the curved portions.

In addition, the linear type pipe portion 113 is formed on the upper side of the U-shaped pipe portion 111.

This is because it is possible to insert a linear line before entering the XL-pipe in a curved line form, so it is configured as described above.

Meanwhile, the lower plate pipe 110 may be formed as a straight lower plate pipe 119 including at least two straight pipe portions 117 horizontally formed at regular intervals.

Figure 7:
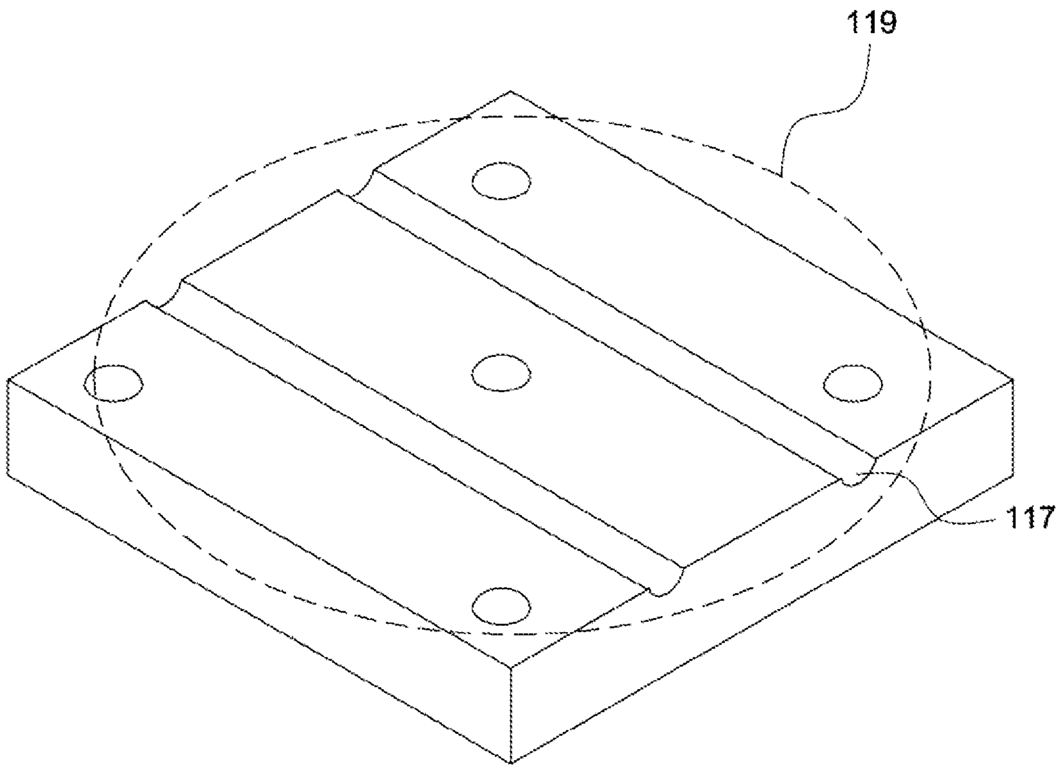
FIG. 7 is a perspective view in which a straight lower plate pipe or a straight plate pipe is formed on a lower plate block or an upper plate block of a Korean underfloor heating block set according to an embodiment of the present invention.

For example, as shown in FIG. 7, the straight lower plate pipe 119 in which two or more straight pipe parts 117 are formed at regular intervals on the lower plate block is formed.

Accordingly, as shown in FIG. 7, the XL-pipe is inserted vertically.

Meanwhile, according to an additional aspect, the lower plate block 100 may further include:

at least one edge coupling protrusion portion 150 protruding from each edge of the lower plate block 100; and at least one inner coupling protrusion portion 160 protruding from an inside of the lower plate block 100.

That is, as shown in FIG. 1, at least one edge coupling protrusion portion 150 is formed to protrude from the edge.

As an example of the present invention, four edge coupling protrusion portions 150 are formed.

In addition, at least one inner coupling protrusion portion 160 may be further formed to protrude from an inside of the lower plate block 100.

As described above, when the protrusions are included, it is possible to determine the position at which the lower plate block and the upper plate block are coupled, so that a wrong coupling can be prevented in advance, Accordingly, when a worker may recognize the coupling of the lower plate block and the upper plate block that are overlapped through the coupling of the edge coupling protrusion portion 250 and the inner coupling concave portion 260 to be described later, and the coupling of the edge coupling protrusion portion 150 and the inner coupling concave portion 660, so that a construction work of the Korean underfloor heating system is performed accurately and quickly.

Figure 3:
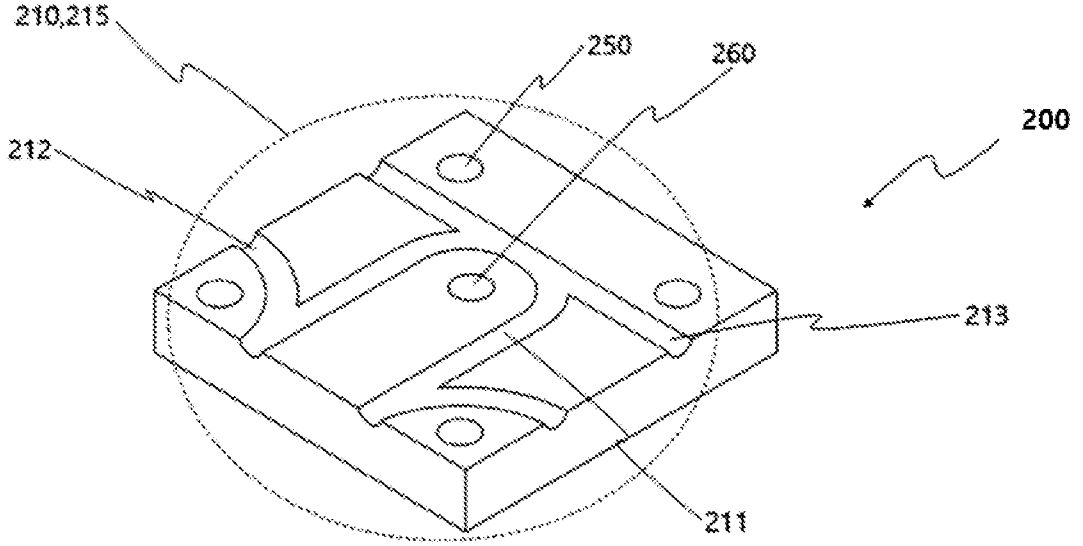
FIG. 3 is a perspective view of the upper plate block 200 of a Korean underfloor heating block set according to an embodiment of the present invention.

FIG. 3 is a perspective view of the upper plate block 200 of a Korean underfloor heating block set according to an embodiment of the present invention.

As shown in FIG. 3, the upper plate block 200 is superimposed on the lower plate block, the upper plate pipe 210 for accommodating the XL-pipe is formed on the bottom surface, and the upper plate block 200 is formed of a human body beneficial mineral.

For example, the mineral beneficial to the human body means at least one of sericite, serpentine and gelite, or a mixture thereof.

The sericite can deliver negative ions and heat deep into the skin, so that sericite provides effects such as maintaining smooth and elastic skin, discharging skin wastes, maintaining healthy skin through the interaction of negative ions and far-infrared radiation, maintaining moist skin with appropriate moisturizing effect, regeneration of skin cells, excellent whitening effect, skin sebum and acne removal effect, proper moisture maintenance and moisturizing effect, sunblock effect, supplying clean air to modern people who are concerned about insomnia and adult diseases, relieving stress, and the like.

In addition, the serpentine can provide effects such as far-infrared radiation, antibacterial, antifungal suppression, deodorizing ability (odor removal), electromagnetic wave blocking and water vein wave blocking effect, blood circulation and metabolism promotion, and the like.

In addition, the gelite may provide effects such as activation of metabolic activity and treatment of various diseases.

In detail, the upper plate pipe 210 includes:

- a non-straight lower plate pipe 215 including a U-shaped pipe portion 211 formed on a central portion;
- a curved branch type pipe portion 212 formed on both sides of the U-shaped pipe portion 211; and
- a linear type pipe portion 213 formed on an upper side of the U-shaped pipe portion 211, or [119] a straight lower plate pipe 219 including at least two straight pipe sections 217 formed horizontally at a predetermined interval.

For example, in the case of a block installed at both ends of the construction site, a conduit for inserting a curved portion of the XL-pipe is required, so that the non-straight lower plate pipe 215 is formed.

In this case, the non-straight lower plate pipe 215 includes a U-shaped pipe portion 211 formed on a central portion;

- a curved branch type pipe portion 212 formed on both sides of the U-shaped pipe portion 211; and
- a linear type pipe portion 213 formed on an upper side of the U-shaped pipe portion 211.

The U-shaped pipe portion 211, the curved branch type pipe portion 212 and the linear type pipe portion 213 are positioned vertically and horizontally with respect to the U-shaped pipe portion 111, the curved branch type pipe portion 112 and the linear type pipe portion 113 of the lower plate block.

In addition, the straight plate pipe 219 means a pipe including; at least two straight pipe parts 217 formed horizontally at regular intervals.

This is to be formed in the block that is installed on the central portion rather than both ends of the installation site, and is positioned vertically with respect to the above-mentioned straight lower plate pipe.

Meanwhile, according to an additional aspect, the lower plate block 100 includes:

- at least one edge coupling concave portion 250 concaved in each edge of the upper plate block 200; and
- at least one inner coupling concave portion 260 concaved in the upper plate block 200.

In this case, the concave groove portion 250 for edge coupling and the recess groove portion 260 for inner coupling are respectively coupled to the edge coupling protrusion 150 and the inner coupling protrusion 160 of the lower plate block.

Figure 4:
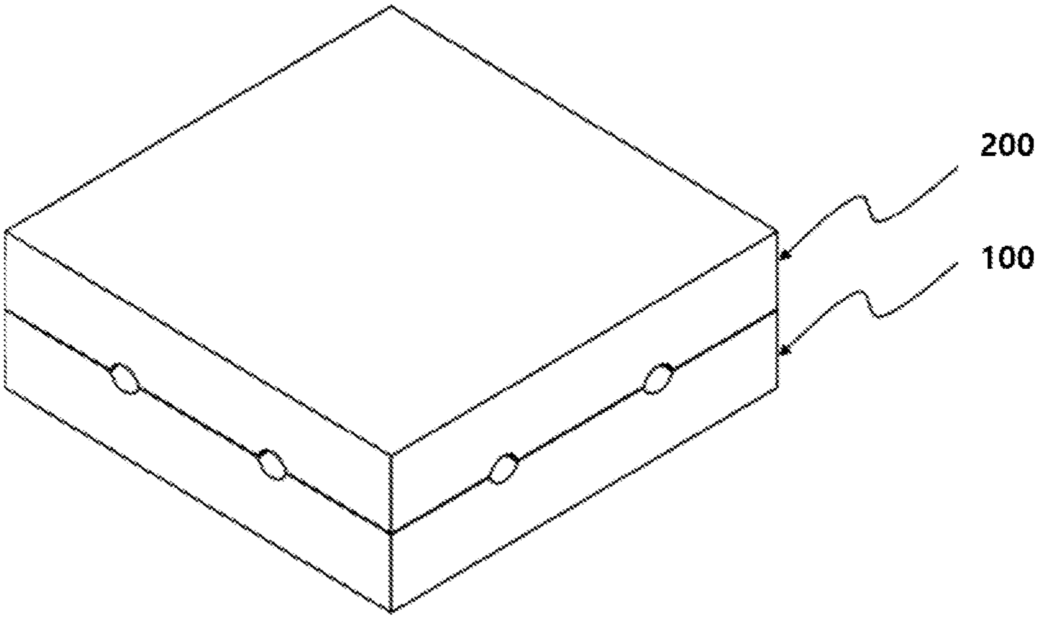
FIG. 4 is an exemplary view in which the lower plate block and the upper plate block of a Korean underfloor heating block set are overlapped according to an embodiment of the present invention.

An example of overlapping the lower plate block and the upper plate block is shown in FIG. 4.

When explaining the installation process, as shown in FIG. 8, the lower plate block 100 is arranged in a block form, and the XL-pipe 300 is inserted into the lower plate conduit formed in the lower plate block. In order to firmly fix the XL-pipe (pipe), the upper plate block 200 is positioned parallel to the upper side of the lower plate block.

In detail, the lower plate blocks having the a non-straight lower plate pipe 115 formed at both ends are arranged, the lower plate blocks having the straight lower plate conduit 119 formed between the both ends are arranged, and the XL-pipe 300 is installed and constructed on the lower plate blocks.

Thereafter, the upper plate blocks in which the non-straight lower plate pipe 215 is formed are arranged on the upper side of the lower plate blocks, and when the upper plate blocks in which the straight lower plate pipe 219 is formed between both ends are arranged on the upper side, the XL-pipe 300 positioned above the lower plate blocks is firmly fixed.

Figure 5:
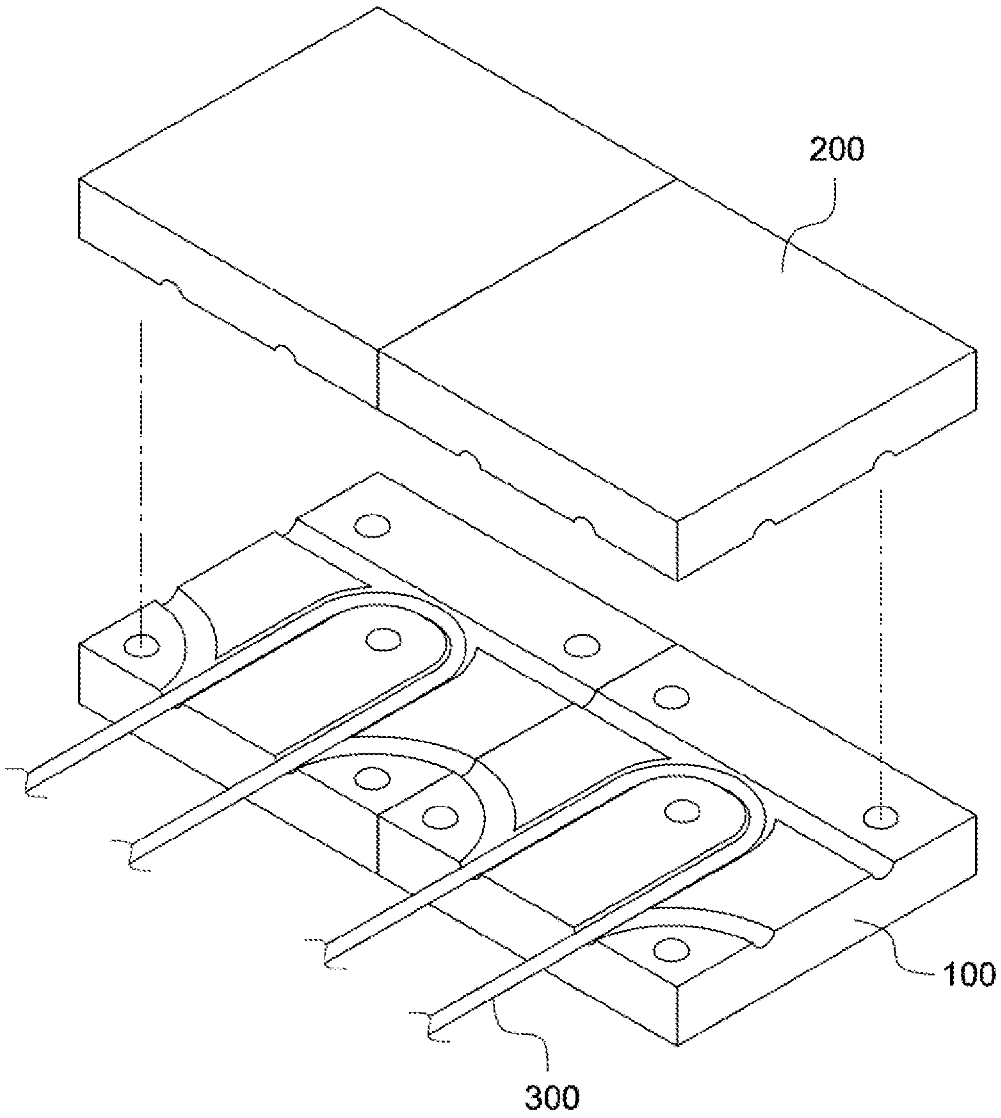
FIG. 5 is an exploded perspective view of a Korean underfloor heating block set according to an embodiment of the present invention.
Figure 6:
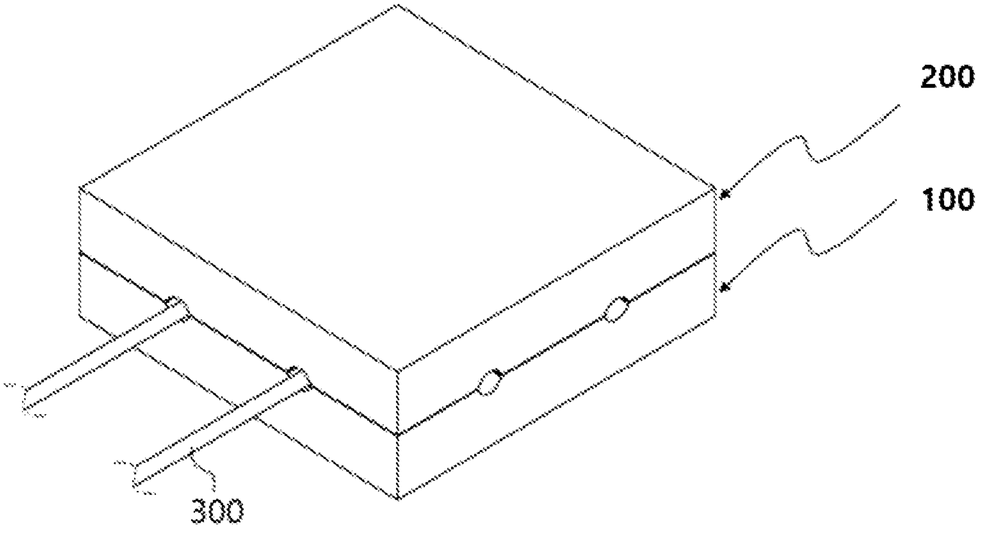
FIG. 6 is an exemplary view of inserting an XL-pipe 300 into a lower plate pipe of a Korean under floor heating block set according to an embodiment of the present invention, and overlapping an upper plate block.

For example, as shown in FIG. 5, when the XL-pipe 300 is inserted into the lower plate conduit of the lower plate block, and the upper plate block is overlapped, the shape shown in FIG. 6 is obtained.

Figure 9:
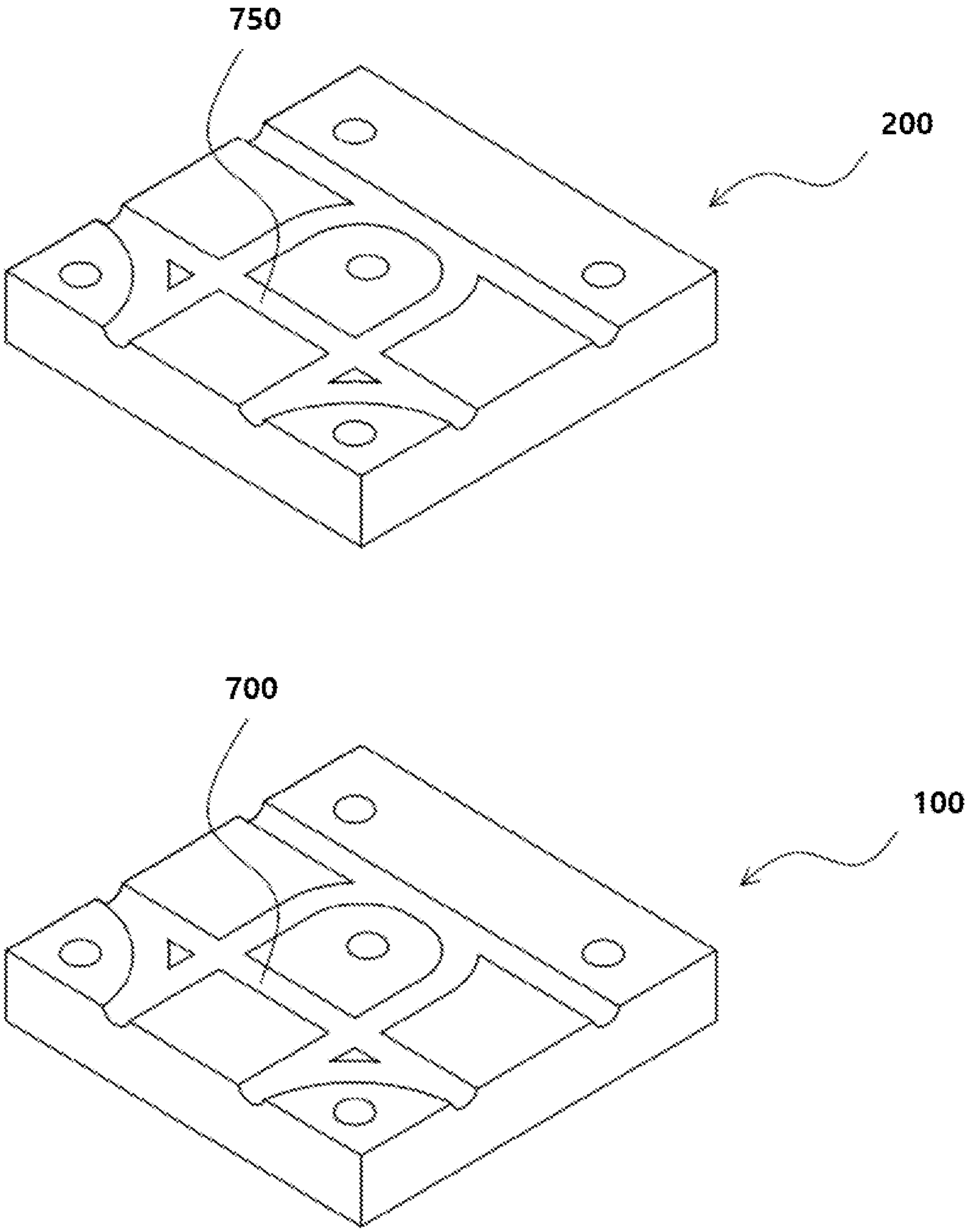
FIG. 9 is another exemplary view of the lower plate block and the upper plate block of a Korean underfloor heating block set according to an embodiment of the present invention.

Meanwhile, as shown in FIG. 9, the lower plate block and upper plate block of the Korean underfloor heating block set according to an embodiment of the present invention are configured as follows.

That is, the lower plate block 100 forms a lower plate conduit that includes

- a U-shaped pipe portion 111 formed on a central portion;
- a cured branch type pipe portion 112 formed on both sides of the U-shaped pipe portion 111;
- a linear type pipe portion 113 formed on an upper side of the U-shaped pipe portion 111; and
- a second linear type pipe portion 700 formed in parallel with the linear type pipe portion 113 at a location spaced apart from the linear type pipe portion 113 by a predetermined distance.

In addition, the upper plate block 200 forms the upper plate conduit that includes a U-shaped pipe portion 211 formed on a central portion;

a curved branch type pipe portion 212 formed on both sides of the U-shaped pipe portion 211;

a linear type pipe portion 213 formed on an upper side of the U-shaped pipe portion 211; and a second linear type pipe portion 750 formed in parallel with the linear type pipe portion 213 at a location spaced apart from the linear type pipe portion 213 by a predetermined distance.

As described above, the lower plate pipe additionally formed with the second linear type pipe portion 700 and the upper plate block is additionally formed with the second linear type pipe portion 750 to insert linear lines of at least two XL-pipes.

In detail, the second linear type pipe portion 700 and the second linear type pipe portion 750 are located at portions at which one side of the curved branch type pipe portion 112 formed in the lower plate block and the curved branch type pipe portion 212 formed in the upper plate block are in contact with each other.

Accordingly, the Korean underfloor heating system is quickly constructed at a desired place with only the lower plate block and the upper plate block without a need to prepare a lower plate block having a straight lower plate pipe and an upper plate block having a straight plate pipe formed not only on both ends but also on a middle part between both ends, According to the above configuration, it is possible to make the construction of a Korean underfloor heating system simple and convenient by assembling blocks, greatly reduce the construction period and construction cost of the Korean underfloor heating system, and provide a health-promoting function and an eco-friendly environment provided by loess, sericite, precious serpentine, and gelite.

In addition, provided is an effect that makes it possible to safely insert, without misalignment, an XL-pipe that is bent to be rounded at a corner or an edge, by forming a lower plate pipe 110 and an upper plate pipe 210 to include a U-shaped pipe portion, a curved branch type pipe portion, and a linear type pipe portion.

In addition, it is possible to form the coupling protrusion portion in the lower plate block 100 and the coupling concave portion in the upper plate block 200, so that the lower plate block and the upper plate block can be assembled more quickly and accurately without errors.

Those skilled in the art to which the present invention of the above content pertains will understand that the present invention may be implemented in other specific forms without changing the technical spirit or essential features of the present invention. Therefore, it should be understood that the embodiments described above are illustrative in all aspects and not restrictive.

INDUSTRIAL APPLICABILITY

According to the present invention, it is possible to make the construction of a Korean underfloor heating system simple and convenient by assembling blocks, greatly reduce the construction period and construction cost the Korean underfloor heating system, and provide a health-promoting function and an eco-friendly environment provided by loess, sericite, precious serpentine, and gelite, so that the present invention will be widely used in the field of Korean underfloor heating system.

The invention claimed is:

1. A Korean underfloor heating block set comprising:

a lower plate block formed on an upper surface thereof with a lower plate pipe for accommodating an XL-pipe and formed of a loess material; and an upper plate block constructed to overlap the lower plate block, formed on a bottom surface thereof with an upper plate pipe for accommodating an XL pipe, and formed of a mineral material beneficial to a human body, wherein the lower plate block includes the lower plate pipe which includes:

a U-shaped pipe portion formed on a central portion;

a curved branch type pipe portion formed on both sides of the U-shaped pipe portion;

a linear type pipe portion formed on an upper side of the U-shaped pipe portion; and a second linear type pipe portion formed in parallel with the linear type pipe portion at a location spaced apart from the linear type pipe portion by a predetermined distance, wherein the upper plate block includes an upper plate pipe which includes:

a U-shaped pipe portion formed on a central portion;

a curved branch type pipe portion formed on both sides of the U-shaped pipe portion;

a linear type pipe portion formed on an upper side of the U-shaped pipe portion; and a second linear type pipe portion formed in parallel with the linear type pipe portion at a location spaced apart from the linear type pipe portion by a predetermined distance, wherein each of the lower plate pipe and the upper plate pipe is formed with the U-shaped pipe portion, the curved branch type pipe portion, and the linear type pipe portion such that an XL-pipe that is bent to be rounded at a corner or an edge is safely inserted without misalignment, wherein the lower plate block is additionally formed with the second linear type pipe portion and the upper plate block is additionally formed with the second linear type pipe portion to insert linear lines of at least two XL-pipes, thereby forming a ''-shaped conduit line, wherein the second linear type pipe portion and the second linear type pipe portion are located at portions where one side of the curved branch type pipe portion formed in the lower plate block and the curved branch type pipe portion formed in the upper plate block are in contact with each other, such that a Korean underfloor heating system is quickly constructed at a desired place with only the lower plate block and the upper plate block without a need to prepare the lower plate block having a straight lower plate pipe and an upper plate block having a straight upper plate pipe formed not only on both ends, but also on a middle part between both ends, wherein the lower plate block includes: at least one edge coupling protrusion portion protruding from each edge of the lower plate block; and at least one inner coupling protrusion portion protruding from an inside of the lower plate block, wherein the upper plate block includes: at least one edge coupling concave portion concaved in each edge of the upper plate block; and at least one inner coupling concave portion concaved in the upper plate block, wherein the mineral beneficial to the human body and forming the upper plate block includes at least one of sericite, serpentine and gelite, or a mixture thereof, wherein the lower plate block is formed using loess instead of toxic cement, thereby providing far-infrared rays and antibacterial action, wherein, when the lower plate block and the upper plate block are coupled through the edge coupling protrusion portion and the inner coupling protrusion portion, a coupling location is determined, and a wrong coupling prevented in advance, wherein, when the edge coupling protrusion portion is coupled to the edge coupling concave portion, and the inner coupling protrusion portion is coupled to the inner coupling concave portion, it is possible to know whether the overlapping lower plate block and upper plate block are accurately combined, such that a construction work of the Korean underfloor heating system is performed accurately and quickly, and wherein the upper plate block is positioned parallel to an upper side of the lower plate block in order to arrange the lower plate block in a block shape, insert the XL-pipe into a lower plate conduit formed in the lower plate block, and securely fix the XL-pipe.

* * * * *